United States Patent
Okuda

(10) Patent No.: US 9,952,050 B2
(45) Date of Patent: Apr. 24, 2018

(54) METHOD, SYSTEM AND DEVICE FOR REMOTELY NOTIFYING INFORMATION

(71) Applicant: FURUNO ELECTRIC CO., LTD., Nishinomiya, Hyogo (JP)

(72) Inventor: Masato Okuda, Nishinomiya (JP)

(73) Assignee: FURUNO ELECTRIC COMPANY LIMITED, Nishinomiya (JP)

( * ) Notice: Subject to any disclaimer, the term of this patent is extended or adjusted under 35 U.S.C. 154(b) by 0 days.

(21) Appl. No.: 14/919,054

(22) Filed: Oct. 21, 2015

(65) Prior Publication Data

US 2016/0123739 A1    May 5, 2016

(30) Foreign Application Priority Data

Oct. 31, 2014  (JP) .................................. 2014-223782

(51) Int. Cl.
  *G01C 21/20*   (2006.01)
  *B63B 49/00*   (2006.01)

(52) U.S. Cl.
  CPC .............. *G01C 21/20* (2013.01); *B63B 49/00* (2013.01)

(58) Field of Classification Search
  CPC ....... B62B 49/00; B63B 49/00; G01C 21/206; G05D 1/0011
  USPC ......................................................... 701/537
  See application file for complete search history.

(56) References Cited

U.S. PATENT DOCUMENTS

| | | | | |
|---|---|---|---|---|
| 5,191,341 A | * | 3/1993 | Gouard ................ | G01C 21/203 342/386 |
| 2004/0239688 A1 | * | 12/2004 | Krajec .................. | G01S 5/0257 345/629 |
| 2014/0156184 A1 | * | 6/2014 | Chiu .................... | G01C 21/3679 701/519 |
| 2015/0033176 A1 | * | 1/2015 | Miichi ................. | G09B 29/007 715/771 |
| 2015/0035772 A1 | * | 2/2015 | Asahara ................ | B63B 49/00 345/173 |
| 2015/0350552 A1 | * | 12/2015 | Pryszo ............... | H04N 5/23293 348/143 |
| 2016/0101341 A1 | * | 4/2016 | Faure ................. | A63B 71/0686 700/91 |

FOREIGN PATENT DOCUMENTS

JP   2013-079813 A   5/2013

* cited by examiner

*Primary Examiner* — Yazan A Soofi

(74) *Attorney, Agent, or Firm* — Studebaker & Brackett PC

(57) ABSTRACT

An information remote notification device is provided. The information remote notification device includes an orientation sensor configured to detect an oriented direction of the information remote notification device, a communicator configured to acquire sensor information from an external terminal device, and a notifier configured to notify the sensor information corresponding to the oriented direction detected by the orientation sensor. The sensor information is obtained by transmitting and receiving a detection signal and includes at least information obtained from a direction corresponding to the oriented direction detected by the orientation sensor.

14 Claims, 6 Drawing Sheets

METHOD, SYSTEM AND DEVICE FOR REMOTELY NOTIFYING INFORMATION

CROSS-REFERENCE TO RELATED APPLICATION(S)

This application claims priority under 35 U.S.C. § 119 to Japanese Patent Application No. 2014-223782, which was filed on Oct. 31, 2014, the entire disclosure of which is hereby incorporated by reference.

TECHNICAL FIELD

This disclosure generally relates to an information remote notification device, which remotely displays a detection result of a sensor configured to detect information in the vicinity of the sensor.

BACKGROUND OF THE INVENTION

Conventionally, display devices which acquire information from a plurality of ship instruments and display the information are known. JP2013-079813A discloses a display device of such a kind.

The display device of JP2013-079813A (a touch panel device) stores nautical chart information and displays a nautical chart in the vicinity of a ship concerned. The display device can also receive detection results from a fish finder and a radar antenna and display the detection results. A user can grasp a situation in the vicinity of the ship concerned by referring to the display device.

Meanwhile, the display device such as the one in JP2013-079813A is fixed to a position in a location where the ship is steered (e.g., the bridge, the command room of the ship). Therefore, the user needs to stay in front of the display device all the time, otherwise he/she cannot constantly grasp the situation in the vicinity of the ship concerned. Since the user may take a break, go fishing, etc., at a different location, it is difficult to make those moves while grasping the situation in the vicinity of the ship concerned.

Moreover, the user generally confirms the situation in the vicinity of the ship concerned visually in addition to by using the ship instrument. Therefore, the user needs to frequently change his/her line of sight between the display device and the vicinity of the ship concerned. Also, in a case of searching, on the display device, for information corresponding to visually-confirmed information so as to know the detail of the information, the correspondence between an actual azimuth and an azimuth on the display device needs to be grasped, and the confirmation of the situation in the vicinity of the ship concerned cannot smoothly be performed. Similarly, also in a case of visually confirming the information which is displayed on the display device, the confirmation cannot smoothly be performed.

Note that these issues not only arise with ships, but commonly arise when a sensor is used to detect information therearound.

SUMMARY OF THE INVENTION

The purpose of this disclosure relates to providing an information remote notification device, which allows, when visually confirming a situation in the vicinity of a user, to simultaneously grasp sensor information which is a detection result of a sensor configured to detect information in the vicinity of the sensor.

According to one aspect of the present disclosure, an information remote notification device with the following configuration is provided. Specifically, the information remote notification device includes an orientation sensor configured to detect an oriented direction of the information remote notification device, a communicator configured to acquire sensor information from an external terminal device, and a notifier configured to notify the sensor information corresponding to the oriented direction detected by the orientation sensor. The sensor information is obtained by transmitting and receiving a detection signal and includes at least information obtained from a direction corresponding to the oriented direction detected by the orientation sensor.

Thus, when visually confirming a situation of the vicinity of a user, the sensor information acquired from the external terminal device can also be grasped simultaneously, and therefore, a load on the user can be reduced. Further, a position indicated by the sensor information and contents of the sensor information can instinctively be grasped. Moreover, the information held by the external terminal device can be grasped even at a distant position from the external terminal device. Furthermore, since the sensor information is notified remotely, the user can grasp the situation of the vicinity thereof in detail even if he/she does not stay in front of the external terminal device.

The information remote notification device preferably has the following configuration. Specifically, the communicator transmits the oriented direction to the external terminal device and receives, from the external terminal device, the sensor information corresponding to the oriented direction. The notifier notifies the sensor information received from the external terminal device.

Thus, latest sensor information can be acquired and notified. Moreover, since the information remote notification device does not need to store the sensor information, the capacity of a memory of the information remote notification device can be small.

When at least operation of determining a range in the oriented direction by specifying at least one of a start position and a terminal position is performed, the notifier preferably notifies the sensor information obtained within the determined range in the oriented direction.

Thus, the situation in the vicinity of the user can be grasped in short time.

The notifier preferably includes a display unit configured to display the sensor information corresponding to the oriented direction.

Thus, the sensor information can instinctively be grasped in detail.

The display unit preferably displays a distance from a position at which the displayed sensor information is obtained to the information remote notification device.

Thus, a period of time required to reach a position indicated by the sensor information, can also be grasped. Therefore, a response to the sensor information can be performed at a suitable timing.

The information remote notification device preferably has the following configuration. Specifically, the communicator receives, from the external terminal device, at least an azimuth from which the sensor information is obtained. The display unit displays the azimuth from which the sensor information is obtained.

Thus, the azimuth from which sensor information is obtained can be grasped at a glance. Therefore, the situation in the vicinity of the user can be grasped in short time.

The notifier preferably notifies the sensor information by using any one of vibration, sound and light.

Thus, the user can grasp the existence of the sensor information without looking at the information remote notification device. Moreover, when the sensor information is displayed in addition to using vibration, sound and/or light, the user can visually confirm the situation of the vicinity thereof more frequently.

Among the sensor information corresponding to the oriented direction, the notifier preferably only notifies information satisfying a predetermined criteria.

The sensor information includes extremely detailed information and information of an extremely far area, and if all the information is displayed, confirmation work becomes complex for the user. Therefore, by displaying only the sensor information satisfying the predetermined criteria, sufficient amount of information can be notified to the user.

The information remote notification device preferably has the following configuration. Specifically, the communicator acquires the sensor information obtained by using different kinds of detection signals, from the external terminal device. The notifier notifies the sensor information obtained by using the different kinds of detection signals.

Thus, various sensor information can be notified to the user. Therefore, the user-friendliness can be improved.

The notifier preferably changes a notification mode according to the kind of the detention signal by which the sensor information is detected.

Thus, the user can grasp the sensor information more instinctively.

The notifier preferably notifies a detection result of a radar apparatus as the sensor information.

Thus, the radar apparatus can detect the situation of the vicinity thereof even when visibility is poor because the vicinity is dark and/or foggy. Therefore, information useful for visually confirming the situation of the vicinity of the user can be provided. Moreover, the radar apparatus can detect a target object in a far area. Therefore, the visual confirmation work can also be assisted in this regard.

The notifier preferably notifies a detection result of an underwater detection device as the sensor information.

Thus, since an underwater situation cannot be visually confirmed, information useful for visually confirming the situation of the vicinity of the user can be provided.

The information remote notification device and the external terminal device are preferably connected to a local area network formed within a predetermined area where the information remote notification device and the external terminal device are located.

Thus, in a case where the predetermined area indicates an area within a ship, because the situation in the vicinity of the user is frequently detected, the effects of this disclosure can be exerted more effectively. Moreover, since the information remote notification device and the external terminal device are disposed close to each other, deviation between an origin of the oriented direction of the information remote notification device and an origin of a direction associated with the sensor information can be reduced.

The information remote notification device and the external terminal device are preferably connected to a wireless local area network.

Thus, management of a cable is unnecessary, and an area in which the information remote notification device is useable can be expanded.

According to another aspect of the present disclosure, an information remote notifying system with the following configuration is provided. Specifically, the information remote notifying system includes an information remote notification device, and an external terminal device provided outside the information remote notification device and configured to acquire sensor information obtained by a sensing device through transmitting and receiving a detection signal. The information remote notification device includes an orientation sensor configured to detect an oriented direction of the information remote notification device, a communicator configured to acquire the sensor information from the external terminal device, and a notifier configured to notify the sensor information corresponding to the oriented direction detected by the orientation sensor.

Thus, when visually confirming the situation of the vicinity of the user, the sensor information acquired from the external terminal device can also be grasped simultaneously, and therefore, a load on a user can be reduced. Moreover, a location indicated by the sensor information and contents of the sensor information can instinctively be grasped.

According to further another aspect of the present disclosure, a method of remotely notifying information with the following configuration is provided. Specifically, the method of remotely notifying information includes detecting an oriented direction of an information remote notification device, acquiring sensor information from an external terminal device, and notifying the sensor information corresponding to the oriented direction. The sensor information obtained by transmitting and receiving a detection signal and including at least information obtained from a direction corresponding to the oriented direction detected by the detecting the oriented direction.

Thus, when visually confirming the situation of the vicinity of the user, the sensor information acquired from the external terminal device can also be grasped simultaneously, and therefore, a load on a user can be reduced. Moreover, a location indicated by the sensor information and contents of the sensor information can instinctively be grasped.

BRIEF DESCRIPTION OF THE DRAWING(S)

The present disclosure is illustrated by way of example and not by way of limitation in the figures of the accompanying drawings, in which the like reference numerals indicate like elements and in which.

DETAILED DESCRIPTION

Next, one embodiment of this disclosure is described with reference to the appended drawings.

A ship instrument network system 1 includes a plurality of ship instruments connected to a ship network 10 of a ship (hereinafter, referred to as "the single ship" or "the own ship"). The ship network 10 is a network for ship instruments of the single ship to communicate with each other, and is not a network for different ships to communicate with each other. The ship instruments of the single ship exchange information detected thereby, etc., via the ship network 10. The ship network 10 is a LAN (Local Area Network). Specifically, any one of Ethernet (registered trademark), a CAN (Controller Area Network), and an NMEA (National Marine Electronics Association) may be adopted.

Figure 1:
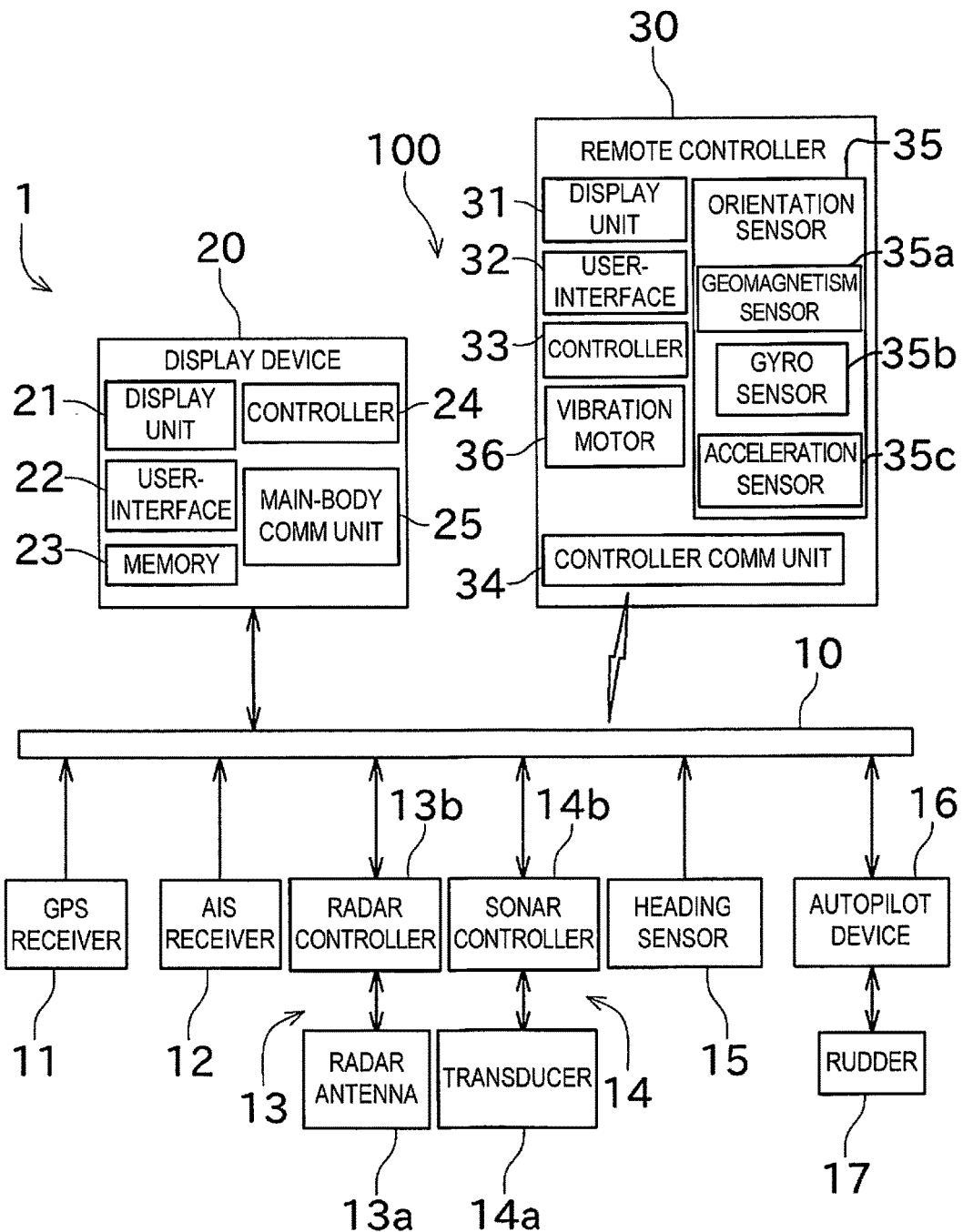
FIG. 1 is a block diagram of a ship instrument network system including an information remote notifying system.

As illustrated in FIG. 1, the ship instrument network system 1 of this embodiment includes a GPS receiver 11, an AIS receiver 12, a radar apparatus (sensing device) 13, a sonar (sensing device, underwater detection device) 14, a heading sensor 15, an autopilot device 16, a display device (external terminal device) 20, and a remote controller (information remote notification device) 30.

The GPS receiver 11 receives positioning signals from GPS satellites (GNSS satellites) via a GPS antenna (not illustrated). The GPS receiver 11 obtains a position of the own ship (specifically, a position of the GPS antenna, a terrestrial-reference absolute position of the own ship) based on the positioning signals and transmits the obtained position to the display device 20.

The AIS receiver 12 receives an AIS signal transmitted from another ship (other ship). An AIS (Universal Shipborne Automatic Identification System) is a system that is mounted on a ship concerned (here, the other ship) and transmits therearound positional information, navigational information, etc., of the ship concerned via a wireless communication. The AIS receiver 12 receives the AIS signal transmitted from the other ship and analyzes it to acquire information of the other ship, such as its absolute position and destination (AIS information). The AIS receiver 12 transmits the acquired AIS information to the display device 20. Since the AIS information includes the absolute position of the other ship, by comparing it with the absolute position of the own ship, an azimuth and a distance at which the other ship exists can be calculated. Note that, the AIS signal may be analyzed by the display device 20.

The radar apparatus 13 includes a radar antenna 13a and a radar controller 13b. The radar antenna 13a transmits an electromagnetic wave (detection signal) and receives a reflection wave caused by the electromagnetic wave reflected on a target object. The radar controller 13b performs suitable signal processing on the reflection wave and then transmits the processed reflection wave to the display device 20. The display device 20 displays a radar image based on information retrieved from the reflection wave received from the radar apparatus 13 (the image at the top right section of the display device 20 in FIG. 2).

Specifically, the radar apparatus 13 obtains a distance to the target object based on a period of time from the transmission of the electromagnetic wave until the reception of the reflection wave. Further, the radar apparatus 13 obtains the azimuth at which the target object exists, based on the direction to which the electromagnetic wave is transmitted. Note that, the radar image may be created by the display device 20 based on the reflection wave. Moreover, an echo with at least a predetermined intensity may be extracted from the reflection wave by the radar apparatus 13, a position corresponding to the echo and the intensity of the echo (detection result) may be transmitted to the display device 20, and the display device 20 may display the radar image based on the detection result.

Also, the radar apparatus 13 of this embodiment may vary a property of the electromagnetic wave depending on the transmission azimuth. Specifically, the intensity (power), frequency, pulse width, etc., of the electromagnetic wave may be changed. Further, the radar apparatus 13 may also not transmit the electromagnetic wave only at a predetermined azimuth or change a transmission interval of the electromagnetic wave at a predetermined azimuth.

The sonar 14 includes a transducer 14a and a sonar controller 14b. The transducer 14a is attached at a bottom of the own ship, transmits an ultrasonic wave (detection signal) underwater, and receives a reflection wave caused by the ultrasonic wave reflected on one of a school of fish and a waterbed. The sonar controller 14b performs suitable signal processing on the reflection wave and then transmits the processed reflection wave (detection result) to the display device 20. The display device 20 displays an underwater detection image based on information retrieved from the reflection wave received from the sonar 14 (the image at the bottom right section of the display device 20 in FIG. 2).

Specifically, the sonar 14 obtains a distance to the one of the school of fish and the waterbed and an azimuth thereof based on a period of time from the transmission of the ultrasonic wave until the reception of the reflection wave and the direction to which the ultrasonic wave is transmitted, similar to the radar apparatus 13. Further, the sonar 14 may measure a fish body length by using the known split-beam method or dual-beam method. Note that, at least part of the processing described above may be performed by the display device 20.

Moreover, the sonar 14 may be one of a search light sonar and a scanning sonar. A search light sonar performs a detection in the vicinity thereof by transmitting an ultrasonic wave that has a detection width range corresponding to a few degrees in azimuth, while changing its transmission azimuth gradually. A scanning sonar performs a detection in the vicinity thereof by simultaneously transmitting ultrasonic waves over the entire or half of entire circumference of a ship concerned. An elevation/depression angle (angle between the transmission direction and the water surface, tilt) of the sonar 14 is changeable. Further, in the case where the sonar 14 is the search light sonar, an intensity or a frequency of the ultrasonic wave to be transmitted at a predetermined azimuth may be changed, the ultrasonic wave may be transmitted only at a predetermined azimuth, etc.

The heading sensor 15 detects a heading of the own ship (direction in which a bow of the own ship is oriented) as a terrestrial-reference absolute azimuth. The heading sensor 15 is any one of a magnetic azimuth sensor, a GPS compass and a gyrocompass, for example.

The autopilot device 16 controls a rudder 17 to follow a designed course. Specifically, the autopilot device 16 calculates a variation angle, that is a difference between the heading acquired from the heading sensor 15 and the designed course, and controls the rudder 17 to change a steering angle so that the variation angle becomes close to zero. Note that, the course is designed by the autopilot device 16, the display device 20, the remote controller 30 or the like.

Figure 2:
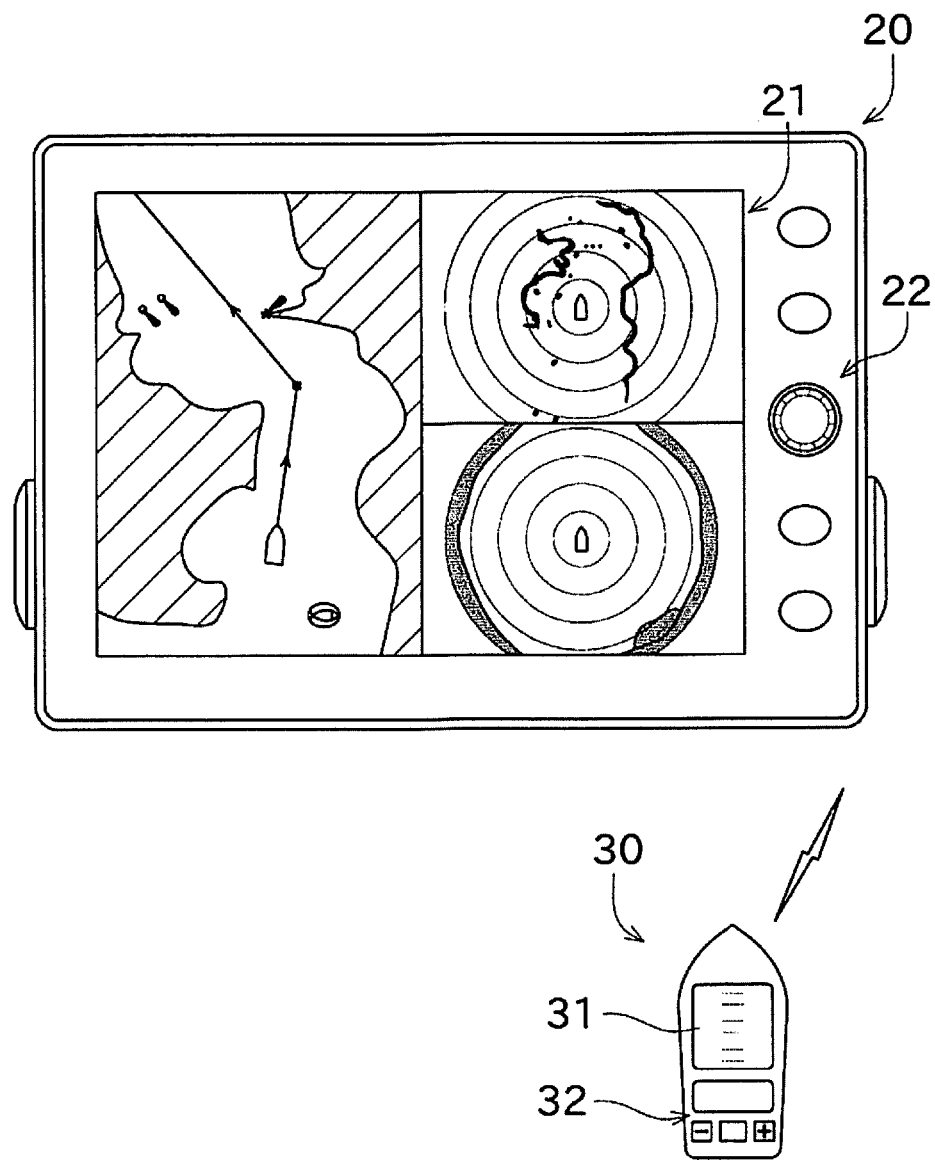
FIG. 2 is an elevational view of a display device and a remote controller.

As illustrated in FIG. 2, the display device 20 creates images (sensor images) based on the information detected by the other ship instruments (sensing devices), displays the created images, and performs processing according to operation performed by a user. Specifically, the display device 20 includes a display unit 21, a user-interface 22, a memory 23, a controller 24, and a main-body communication unit 25.

The display unit 21 is configured by, for example, a liquid crystal display. The display unit 21 displays the sensor images, a setting screen, etc.

The user-interface 22 is configured by a rotational key rotatable in a clockwise/counterclockwise direction, a menu key configured to call for a menu screen, a cursor key, etc. Note that, in the display device 20 of this embodiment, the user-interface is provided to the display device 20 itself; however, other kinds of user-interface, such as a mouse and/or a keyboard, may be externally attachable, and the user-interface may detect touch operation by the user.

The memory 23 stores contents of a program which is executed by the controller 24, nautical chart information, a location specified by the user, etc. The nautical chart information includes positions of a lighthouse, a channel buoy, a port, a fish bed (fishing area), an unnavigable area, a shallow bottom area, and a frozen area, and water depths at these positions. The location specified by the user is at least one of a destination, stopover(s) before reaching the destination (waypoint(s)), and other locations (e.g., a location at which a predetermined school of fish is detected). Since the information included in the nautical chart information and the location specified by the user are associated with absolute positions thereof, by comparing them with the absolute position of the own ship, azimuths and distances to which these information and location correspond can be calculated. Moreover, at least part of the nautical chart information and the location specified by the user may be stored in association with the azimuth from the own ship and the absolute position of the own ship.

The controller 24 creates the radar image, the underwater detection image, a chart image (an image with the position of the own ship on a nautical chart, the image at the left section of the display device 20 in FIG. 2), etc., based on the stored contents in the memory 23 and the information received from the other ship instruments, and displays them on the display unit 21.

The main-body communication unit 25 is an interface communicable with a LAN, and is communicable with the ship instruments connected to the ship network 10.

The remote controller 30 is connected with the ship instruments, such as the display device 20, by a wireless LAN. The remote controller 30 transmits a predetermined instruction to the display device 20 based on a pointing direction of the remote controller 30, receives information from the display device 20, and displays the information. The remote controller 30 of this embodiment is a long flat-plate member formed into a boat shape, and has a size which allows the user to control with one hand. Hereinafter, one side of the remote controller 30 seen in its thickness direction is a front face of the remote controller 30, a bow-side end of the boat shape (one end in its longitudinal direction) is a tip of the remote controller 30, and an opposite side end of the boat shape (an end on the side gripped by the user) is a base end.

As illustrated in FIGS. 1 and 2, the remote controller 30 includes a display unit (notifier) 31, a user-interface 32, a controller 33, a controller communication unit (communicator) 34, an orientation sensor 35, and a vibration motor 36.

The display unit 31 is configured by, for example, a liquid crystal display disposed at the front face of the remote controller 30. The display unit 31 displays the pointing direction of the remote controller 30, the information received from the display device 20, setting information, etc.

The user-interface 32 includes a plurality of keys. The user performs predetermined operation on the user-interface 32 to display the menu screen, select a predetermined menu item, and fix the selection.

The controller 33 controls the respective parts of the remote controller 30. Specifically, the controller 33, according to the operation by the user, generates a signal to be transmitted to the display device 20, converts a signal received from the display device 20 to display it on the display unit 31.

The controller communication unit 34 is configured by, for example, an antenna communicable by a wireless LAN. The controller communication unit 34 is communicable with the display device 20 disposed outside the remote controller 30, via a wireless LAN router (not illustrated) of the ship network 10, for example.

The orientation sensor 35 detects the pointing direction (oriented direction) of the remote controller 30. The orientation sensor 35 of this embodiment includes a geomagnetism sensor 35*a*, a gyro sensor 35*b*, and an acceleration sensor 35*c*. The geomagnetism sensor 35*a* is an electronic compass using geomagnetism, and detects, as a terrestrial-reference absolute azimuth, an azimuth at which the tip of the remote controller 30 points (i.e., the pointing direction of the remote controller 30 in a horizontal plane). The gyro sensor 35*b* detects a posture of the remote controller 30 (e.g., the pointing direction of the remote controller 30 in a plane perpendicular to the horizontal plane). The acceleration sensor 35*c* detects a change of the pointing direction of the remote controller 30. By combining the detection results from these sensors, the orientation sensor 35 can detect the pointing direction of the remote controller 30 (in three-dimensions) and the change of the pointing direction. Further, the orientation sensor 35 can detect whether operation of waving the remote controller 30 is performed by the user, based on the detection results of the gyro sensor 35*b* and the acceleration sensor 35*c*, etc.

Note that, the orientation sensor 35 is not limited to be the combination of three sensors described above, and may be one or a combination of two of the three sensors. Therefore, the pointing direction of the remote controller 30 may be detected in two-dimensions (e.g., the pointing direction in the horizontal plane, i.e., the azimuth). Moreover, the configuration of the orientation sensor described in this embodiment is merely an example, and sensor(s) other than those described above may be used. For example, a GPS compass may be used instead of the geomagnetism sensor 35*a*. Also, the processing of calculating the pointing direction of the remote controller 30 by combining the detection results of the respective sensors may be performed by either one of the remote controller 30 and the display device 20.

The vibration motor 36, upon receiving a predetermined signal from the controller 33, provides a notification to the user by causing vibration. Note that, the timing for the vibration motor 36 to provide the notification is described later.

Figure 3:
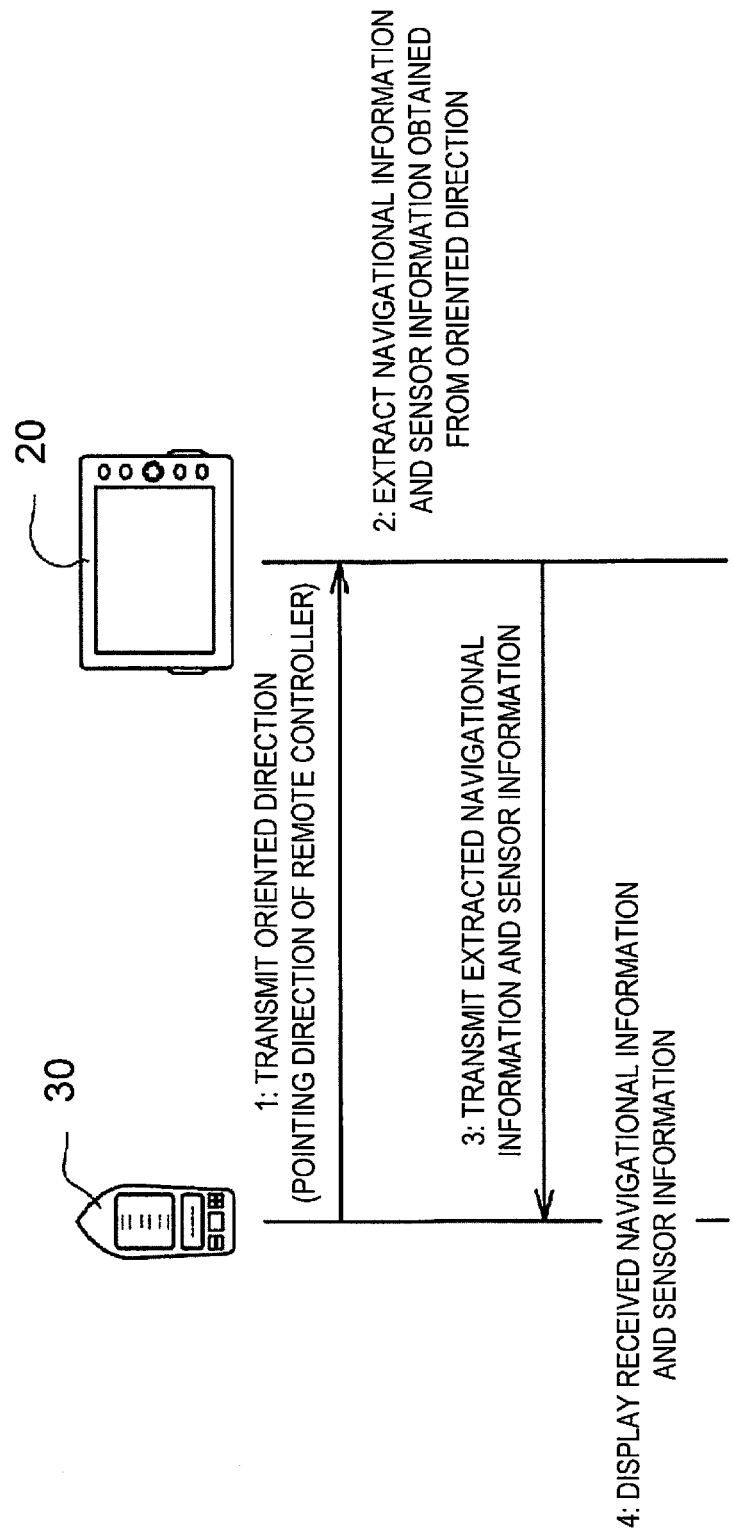
FIG. 3 is a view illustrating a flow of processing of displaying navigational information and sensor information which are obtained from a pointing direction of the remote controller.

Next, processing of displaying, on the display unit 31, the navigational and sensor information obtained from the pointing direction of the remote controller 30 is described with reference to FIG. 3. In the following description, the nautical chart information and the information regarding the location specified by the user described above are comprehensively referred to as the "navigational information." Moreover, devices configured to detect information in the vicinity of the device by transmitting and receiving detection signals, such as the radar apparatus 13 and the sonar 14, may comprehensively be referred to as the "sensing devices." Note that, the remote controller 30 of this embodiment does not only display the detection results of the sensing devices, but also has a function to design a course for the autopilot. Hereinafter, a system including the remote controller 30, the display device 20, and the sensing devices is referred to as an information remote notifying system 100.

The user instructs the remote controller 30 to activate an information display mode in which the information is displayed, by selecting a predetermined menu item on the menu screen of the remote controller 30, for example. Note that, without providing the information display mode, the navigational and sensor information based on a current pointing direction of the remote controller 30 may be displayed on the display unit 31 by predetermined operation on the remote controller 30. In the information display mode, the remote controller 30 transmits, to the display device 20, the oriented direction which is the detection result of the orientation sensor 35 (Sequence No. 1 in FIG. 3).

The display device 20, upon receiving the oriented direction, extracts information related to the oriented direction, from the sensor information received from the AIS receiver 12, the radar apparatus 13, and the sonar 14, and the navigational information stored in the memory 23 (Sequence No. 2). Specifically, the display device 20 selects information associated with one of the oriented direction and a position in the oriented direction. Note that, the information associated with the oriented direction or the like includes information associated with the oriented direction or the like accurately and also information associated with a neighboring area of the oriented direction or the like. Then, the display device 20 further extracts information which is considered to be highly important, from the selected information.

Here, the navigational information and the sensor information (especially the navigational information) may include information of an extremely far area, and thus, if all the information is displayed, confirmation work becomes complex for the user. Therefore in this embodiment, information associated within a predetermined distance from the own ship is extracted. Note that, in the case of determining the extraction candidate based on distance, determination processing is simple and a computation amount can be reduced. Further, in a case where a large amount of information is associated within the predetermined distance, more information may additionally be extracted. In this case, the further extraction may be performed based on, if the information indicates the other ship, whether the information is associated with a position forward of the own ship, and if the information indicates the school of fish, a scale of the school of fish, a fish body length, etc. The display device 20 transmits, to the remote controller 30, contents, the distance from the own ship and the like regarding the extracted navigational and/or sensor information (Sequence No. 3).

The remote controller 30, upon receiving the navigational and/or sensor information from the display device 20, activates the vibration motor 36 to cause vibration and displays the received navigational and/or sensor information on the display unit 31 (Sequence No. 4). By causing the vibration, the user can grasp that the target object and/or the like exists in the oriented direction, without looking at the display unit 31.

Since the processing illustrated in Sequence No. 1 to 4 is performed as needed, when the oriented direction of the remote controller 30 is continuously changed, if the navigational and sensor information is obtained from an area corresponding to the oriented direction of the remote controller 30, the information is displayed on the display unit 31 in real time. Thus, by simply changing the pointing direction of the remote controller 30, the situation in the vicinity of the own ship can be grasped.

Further, for example, in a case where a start position and a terminal position are specified in the azimuth and/or distance direction by using the remote controller 30, the navigational and sensor information associated between the start and terminal positions may be displayed on the display unit 31. Note that, a range of the information to be displayed may be determined by specifying one of the start and terminal positions and taking a predetermined distance/azimuth length from the specified position.

Next, a specific display mode of the navigational and sensor information obtained from the oriented direction of the remote controller 30 is described. First, an example in which the navigational information is displayed on the remote controller 30 is described with reference to FIG. 4.

Figure 4:
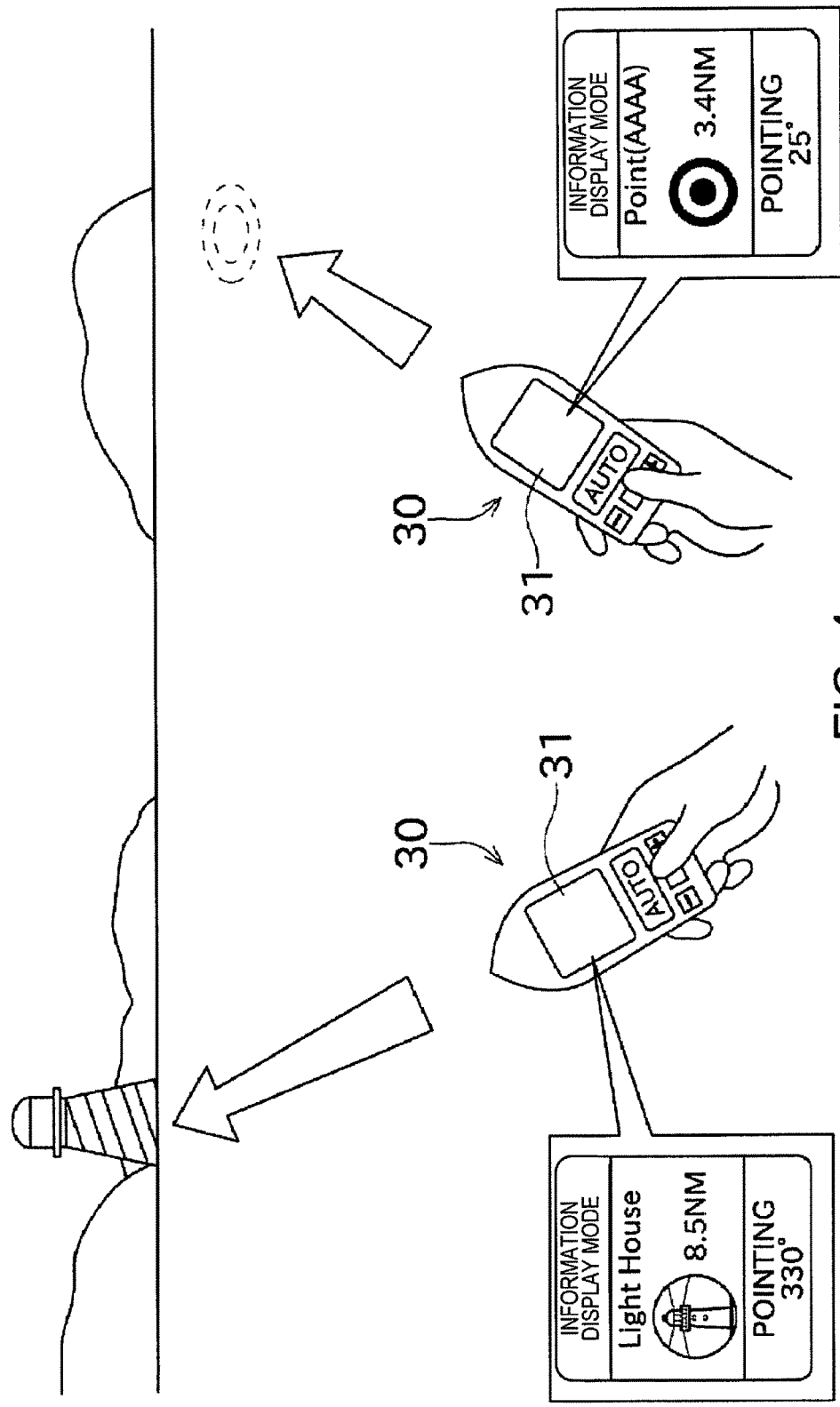
FIG. 4 is a view illustrating one example of the navigational information displayed on the remote controller when the pointing direction of the remote controller is changed.

In the example of FIG. 4, a lighthouse and the location specified by the user are displayed as the navigational information. Specifically, a type (e.g., Light House) of the navigational information, an icon thereof, and a distance thereof from the own ship are displayed. When displaying the type of the navigational information, a specific name thereof may simultaneously be displayed. Further, in addition to such information, related information may also be displayed. For example, when displaying the location specified by the user, time and date of the specification of the location may be displayed. Note that, since the location specified by the user may be any of various locations (e.g., the destination, the stopover, or other locations), the name, etc., of the location may be displayed.

In this embodiment, the display mode is changed for each navigational information by changing the icon according to the displayed navigational information. Note that, the display mode may be changed for each navigational information by changing a display color alternative to/in addition to the icon.

In this embodiment, the display mode may further be changed according to one of importance and dangerousness of the displayed navigational information. For example, when displaying the unnavigable area, the shallow bottom area or the like as the navigational information, different from when other types of navigational information are displayed, the display screen of the display unit 31 partially or entirely blinks. Note that, instead of blinking, the navigational information may be displayed in a color which indicates a high level of importance (e.g., red or yellow).

The navigational information described in this embodiment is an example, and other types of navigational information may be displayed on the remote controller 30. For example, as a reference mark in navigation, a channel buoy may be displayed other than the lighthouse. Further, a port or a fishing area may be displayed. Moreover, for example, a water temperature or weather may be displayed as the navigational information. Note that, the water temperature or the weather is acquirable by a detection using a sensor or a broadcast reception.

Next, an example in which the sensor information is displayed on the remote controller 30 is described with reference to FIG. 5. The sensor information is obtained by transmitting and receiving the detection signal, and changes over time. Further, the sensor information is associated with direction.

Figure 5:
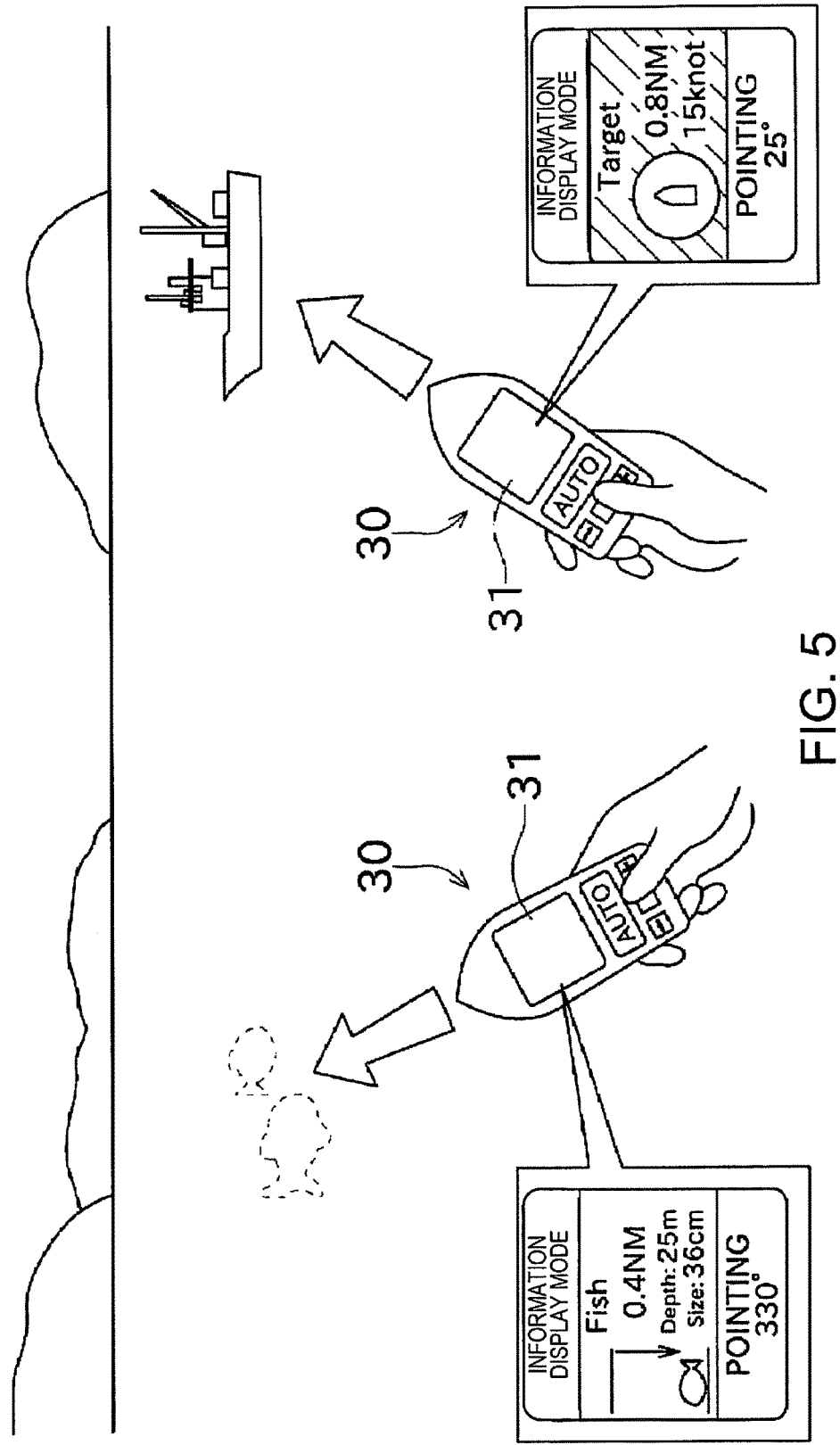
FIG. 5 is a view illustrating one example of the sensor information displayed on the remote controller when the pointing direction of the remote controller is changed.

In the example of FIG. 5, school-of-fish information and other-ship information are displayed as the sensor information. The school-of-fish information is obtained based on the detection result of the sonar 14. The other-ship information is obtained based on the detection result of one of the AIS receiver 12 and the radar apparatus 13.

The display unit 31 of the remote controller 30 displays a type (e.g., Fish) of the sensor information, an icon thereof, a distance thereof from the own ship, and related information thereto. Here, the related information is supplementary information particular for the sensor information. When the sensor information is the school-of-fish information, a water depth at which the school of fish exists and the fish body length are displayed as the related information. Moreover, when the sensor information is the other-ship information, a ship speed (detectable by the radar apparatus 13) is displayed as the related information. Note that, since the AIS information includes a name, course, destination, etc., of the other ship, these information may also be displayed.

In this embodiment, the display mode is changed for each sensor information by changing the icon according to the displayed sensor information. Note that, the display mode may be changed for each sensor information by changing a display color alternative to/in addition to the icon.

In this embodiment, the display mode may further be changed according to one of importance and dangerousness of the displayed sensor information. In the example of FIG. 5, when there is a possibility of collision between the own ship and the other ship of which other-ship information is displayed, the display screen of the display unit 31 partially or entirely blinks. Note that, instead of blinking, the sensor information may be displayed in a color which indicates a high level of importance (e.g., red or yellow). By obtaining at least one of values of a distance from the other ship, a speed of the other ship, a CPA, a TCPA, a BCR and a BCT, the possibility of collision with the other ship is calculated based on the at least one of the obtained values.

Note that, when the target object and the like to be displayed does not exist, the remote controller 30 displays the heading, the course which is set in the autopilot, the oriented direction, etc.

The sensor information described in this embodiment is an example, and other types of sensor information may be displayed on the remote controller 30. For example, the water depth information or information of a bottom segment which are detected by the sonar 14 may be displayed.

Note that, the remote controller 30 of this embodiment can detect, not only the pointing direction in the horizontal direction (azimuth), but also the pointing direction in the vertical direction. Therefore, the sensor and navigational information to be displayed may be switched by taking the pointing direction in the vertical direction into consideration. For example, when the remote controller 30 points obliquely downward with respect to the water surface, information from underwater in the corresponding direction (e.g., the school of fish, the bottom segment, the water depth, etc.) may be displayed, when the remote controller 30 points at a direction in parallel to the water surface, information from on the sea in the corresponding direction (e.g., the other ship, the location specified by the user, etc.) may be displayed, and when the remote controller 30 points obliquely upward with respect to the water surface, information from on the ground in the corresponding direction (e.g., the lighthouse, island, etc.) may be displayed. Note that, the display contents on the display unit 31 may be determined by detecting the pointing direction only in the vertical direction. For example, when the remote controller 30 points directly below the sea surface, the water depth information obtained from directly below the own ship may be displayed.

In this embodiment, the remote controller 30 transmits the oriented direction to the display device 20, and receives the information related to the oriented direction. Thus, latest navigational and sensor information can be displayed. Alternatively, the remote controller 30 may store the navigational and sensor information (the information is updated as needed), and extract the information related to the oriented direction. In this case, since a signal communication is not required, the navigational and sensor information can immediately be displayed on the remote controller 30.

The remote controller 30 of this embodiment can activate an information detection mode in addition to the information display mode described above. In the information detection mode, azimuths with which the sensor information is associated are displayed simultaneously. Hereinafter, such a case is described with reference to FIG. 6.

First, the user performs predetermined operation on the remote controller 30 to instruct the activation of the information detection mode. The remote controller 30 acquires the sensor information from the display device 20 before or after receiving the instruction of activating the information detection mode. Here, the azimuths of the sensor information may solely be acquired, and contents of the information may be acquired in addition to the azimuths. In the information detection mode, as illustrated on the remote controller 30 in FIG. 6, a ship mark 41, an oriented azimuth display mark 42, and azimuth marks 43 are displayed.

The ship mark 41 indicates the heading and, as a value, a range for which acquisition of the sensor information is illustrated. Any value may be set to indicate the range (distance range). The oriented azimuth display mark 42 indicates an oriented azimuth of the remote controller 30. Each of the azimuth marks 43 indicates an azimuth and whether the sensor information is obtained from the corresponding azimuth. Specifically, the sensor information is not obtained from the azimuth indicated by the azimuth mark 43 illustrated in white, and the sensor information is obtained from the azimuth indicated by the azimuth mark 43 illustrated filled by a darker color in gray scale.

Figure 6:
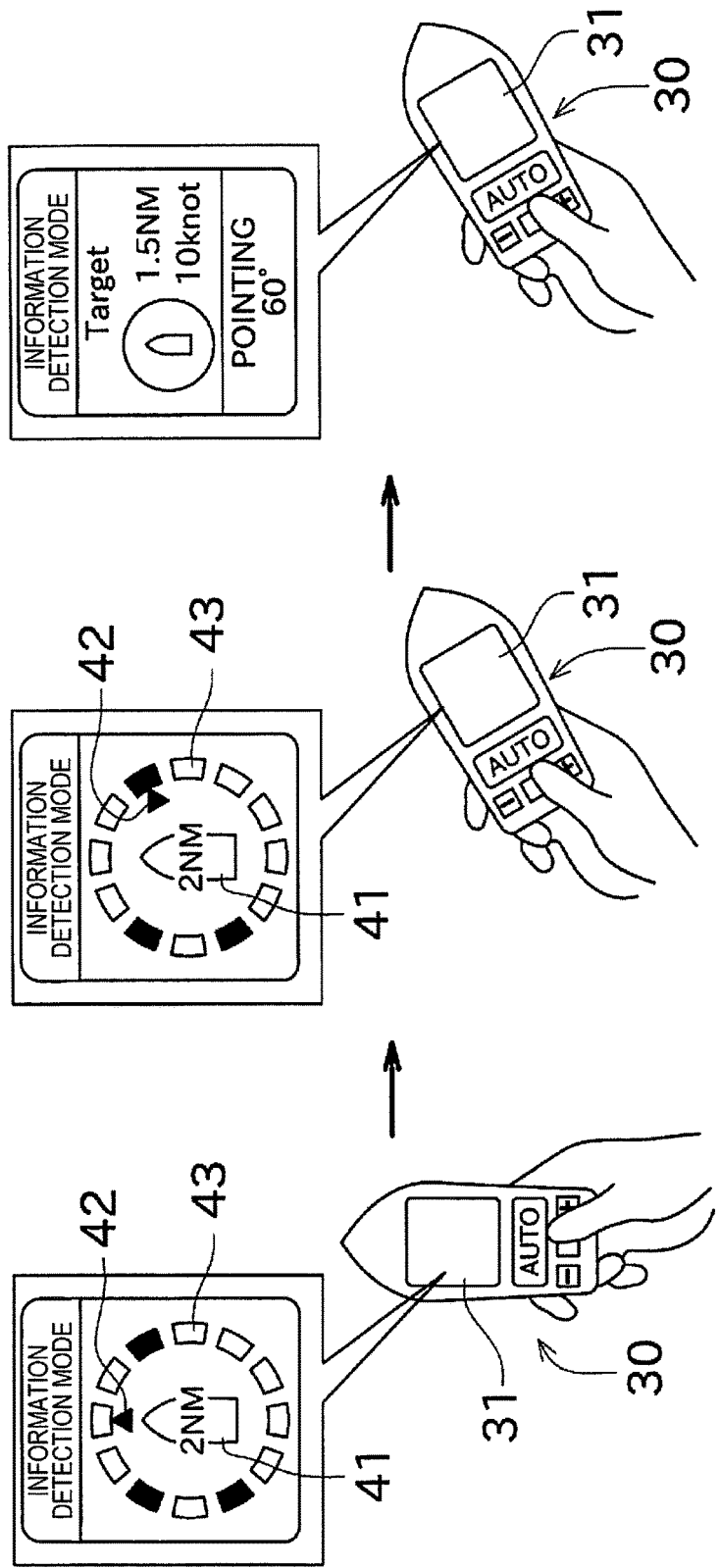
FIG. 6 is a view for describing an information detection mode in which an azimuth from which the sensor information is obtained is displayed.

The user, upon activation of the information display mode (the remote controller 30 at the left of FIG. 6), performs predetermined operation on the remote controller 30 while pointing it at the azimuth from which the sensor information is obtained (the remote controller 30 at the center of FIG. 6), and thus, the details of the sensor information obtained from the corresponding azimuth can be displayed on the display unit 31 (the remote controller 30 at the right of FIG. 6). Note that, when a plurality of sensor information are obtained from the azimuth indicated by the azimuth mark 43, the displayed information can be switched by performing predetermined operation. Further, the marks and the like described above are arbitrary, and may suitably be changed. For example, the azimuth from which the sensor information is obtained may be displayed as characters instead of an illustration.

As described above, the remote controller 30 includes the orientation sensor 35, the controller communication unit 34, and the display unit 31. The orientation sensor 35 detects the oriented direction of the remote controller 30. The controller communication unit 34 acquires the sensor information (including at least the information obtained from a direction corresponding to the oriented direction detected by the orientation sensor 35) that is obtained by transmitting and receiving the detection signal. The display unit 31 notifies (displays) the sensor information corresponding to the oriented direction detected by the orientation sensor 35.

Thus, when visually confirming the situation in the vicinity of the user, since the sensor information acquired by the display device 20 can also be grasped simultaneously, a load on the user can be reduced. Further, the position indicated by the sensor information and the contents of the sensor information can instinctively be grasped. Moreover, the information held by the display device 20 can be grasped even at a distant position from the display device 20.

Although the preferred embodiment of this disclosure is described above, the above configuration may be modified as follows.

In the above embodiment, the remote controller 30 acquires the sensor information from the display device 20; however, the sensor information may be acquired directly from each sensing device. In this case, the sensing device may be referred to as the "external terminal device." Moreover, the information remote notifying system 100 may be configured by a single ship instrument and a remote controller.

In the above embodiment, the remote controller 30 receives the sensor information which is already held by the display device 20; however, the remote controller 30 may first transmit the oriented direction to the display device 20, and then each sensing device may detect the sensor information from the transmitted oriented direction and transmit the detection result to the remote controller 30.

The shape of the remote controller 30 is arbitrary, and for example, it may have a stick shape or a rectangular flat plate shape. Further, the remote controller 30 may be connected with any one of the display device 20 and the sensing devices by wire. In this case, the navigational and sensor information may be displayed without connecting the remote controller 30 to a local area network.

In the above embodiment, the remote controller 30 notifies using vibration simultaneously to displaying the navigational and sensor information on the display unit 31; however, the notification may be provided using sound or light instead of/in addition to vibration. Further, instead of notifying the navigational and sensor information by displaying them on the display unit 31, the notification may be provided solely by using one of vibration, sound and light. In this case, the display unit 31 may be omitted in the remote controller 30. Moreover, the remote controller 30 may be configured as a touch screen without including any physical key.

The above-described ship instruments connected to the ship network 10 are merely an example, and may suitably be changed. For example, a fish finder (sensing device, underwater detection device) configured to transmit ultrasonic waves directly below the own ship may be connected to the ship network 10.

In the above embodiment, an example of applying the information remote notifying system 100 to a ship is described; however, the information remote notifying system 100 may be applied to movable bodies other than the ship, such as an airplane or an automobile. For example, since an airplane is provided with a radar apparatus, the information remote notifying system 100 may be applied to the airplane, similar to the above embodiment. Moreover, other than the movable bodies, the information remote notifying system 100 may be applied to a system configured to notify a detection result of a meteorological radar.

In the foregoing specification, specific embodiments of the present disclosure have been described. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. An information remote notification device, comprising:
   a handheld elongated main body with a display;
   an orientation sensor configured to detect an oriented direction of the information remote notification device that is orientable independently of a ship, the oriented direction being a direction in which one longitudinal end of the handheld elongated main body is pointing;
   a controller configured to transmit an instruction including data representing the oriented direction specified by a user to an external terminal device that is provided in the ship and is external to the information remote notification device, and configured to receive, based on the oriented direction, sensor information corresponding to the oriented direction that the external terminal device obtained by transmitting and receiving a detection signal from an active sensor that is configured to transmit a transmission wave and receive a reception wave from the transmission wave, from the external terminal device; and
   circuitry configured to display information pertaining to the sensor information in the oriented direction on the display.

2. The information remote notification device of claim 1, wherein when at least an operation of determining a range in the oriented direction by specifying at least one of a start position and a terminal position is performed, the display displays the information pertaining to the sensor information obtained within the determined range in the oriented direction.

3. The information remote notification device of claim 1, wherein the display displays a distance from a position at which the displayed sensor information is obtained to the information remote notification device.

4. The information remote notification device of claim 1, wherein
   the controller receives, from the external terminal device, at least an azimuth from which the sensor information is obtained, and
   the display displays the azimuth from which the sensor information is obtained.

5. The information remote notification device of claim 1, wherein the output is further configured to output the sensor information by using any one of vibration, sound and light.

6. The information remote notification device of claim 1, wherein among the sensor information corresponding to the oriented direction, the display displays information satisfying a predetermined criteria and refrains from displaying information failing to satisfy the predetermined criteria.

7. The information remote notification device of claim 1, wherein
   the controller acquires the sensor information obtained by using different kinds of detection signals, from the external terminal device, and
   wherein the display displays the sensor information obtained by using the different kinds of detection signals.

8. The information remote notification device of claim 7, wherein the output changes a notification mode according to the kind of the detection signal by which the sensor information is detected.

9. The information remote notification device of claim 1, wherein the output outputs a detection result of a radar apparatus as the sensor information, the radar apparatus being configured as the active sensor.

10. The information remote notification device of claim 1, wherein the output outputs a detection result of an underwater detection device as the sensor information, the underwater detection device being configured as the active sensor.

11. The information remote notification device of claim 1, wherein the information remote notification device and the external terminal device are connected to a local area network formed within a predetermined area where the information remote notification device and the external terminal device are located.

12. The information remote notification device of claim 11, wherein the information remote notification device and the external terminal device are connected to a wireless local area network.

13. An information remote notifying system, comprising:
an information remote notification device;
an active sensor configured to transmit a transmission wave and receive a reception wave from the transmission wave; and
an external terminal device provided outside the information remote notification device and configured to acquire sensor information obtained by a sensing device through transmitting and receiving a detection signal from the active sensor,
the information remote notification device including:
a handheld elongated main body with a display;
an orientation sensor configured to detect an oriented direction of the information remote notification device that is orientable independently of a ship, the oriented direction being a direction in which one longitudinal end of the handheld elongated main body is pointing;
a controller configured to transmit an instruction including data representing the oriented direction specified by a user to the external terminal device, and configured to receive, based on the oriented direction, the sensor information corresponding to the oriented direction, from the external terminal device; and
circuitry configured to display information pertaining to the sensor information in the oriented direction on the display.

14. A method of remotely notifying information, comprising:
detecting an oriented direction of an information remote notification device comprising a handheld elongated main body with a display, the information remote notification device being orientable independently of a ship, and the oriented direction being a direction in which one longitudinal end of the handheld elongated main body is pointing;
transmitting, as controlled by a controller on the information remote notification device, an instruction including data representing the oriented direction specified by a user an external terminal device that is provided in the ship and is external to the information remote notification device;
receiving at the information remote notification device, based on the oriented direction, sensor information corresponding to the oriented direction that the external terminal device obtained by transmitting and receiving a detection signal from an active sensor that is configured to transmit a transmission wave and receive a reception wave from the transmission wave; and
displaying information pertaining to the sensor information in the oriented direction on the display.

* * * * *